US008382162B2

(12) United States Patent
Hourai

(10) Patent No.: US 8,382,162 B2
(45) Date of Patent: Feb. 26, 2013

(54) FUEL TANK MOUNTING STRUCTURE FOR VEHICLE

(75) Inventor: Tatsuya Hourai, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/188,652

(22) Filed: Jul. 22, 2011

(65) Prior Publication Data

US 2012/0025509 A1 Feb. 2, 2012

(30) Foreign Application Priority Data

Jul. 30, 2010 (JP) .................................. 2010-173075

(51) Int. Cl.
*B60P 3/22* (2006.01)
(52) U.S. Cl. .................. 280/834; 280/830; 220/562
(58) Field of Classification Search .................. 280/830, 280/831, 832, 834, 837, 838; 220/562, 563, 220/564
See application file for complete search history.

(56) References Cited

U.S. PATENT DOCUMENTS

| 5,195,780 | A | * | 3/1993 | Inoue et al. ..................... 280/834 |
| 5,547,224 | A | * | 8/1996 | Kami et al. ..................... 280/834 |
| 6,875,258 | B2 | * | 4/2005 | Kuperus ........................... 96/147 |
| 7,658,414 | B2 | * | 2/2010 | Watanabe et al. ............. 280/834 |
| 2009/0189384 | A1 | * | 7/2009 | Schoen et al. ................. 280/834 |

FOREIGN PATENT DOCUMENTS

JP 2001-063389 A 3/2001

* cited by examiner

*Primary Examiner* — Anne Marie Boehler
*Assistant Examiner* — Marc A Scharich
(74) *Attorney, Agent, or Firm* — Lerner, David, Littenberg, Krumholz & Mentlik, LLP

(57) ABSTRACT

The present invention relates to a fuel tank mounting structure for a vehicle which includes a rear floor panel forming a rear portion floor, a first cross member disposed in front of and under the rear floor panel and extending in a vehicle width direction, and a second cross member disposed rearward of the first cross member and extending in the vehicle width direction. A fuel tank is supported by belts stretched between the first and the second cross members so as to abut on an undersurface of the rear floor panel via a resilient pad. Brackets are joined to the first cross member such that they project rearward of the first cross member, each of the belts is connected to the first cross member by the corresponding bracket, and the fuel tank abuts on a rear surface of each bracket via a second resilient pad.

5 Claims, 4 Drawing Sheets

CROSS SECTION A-A

FIG.1
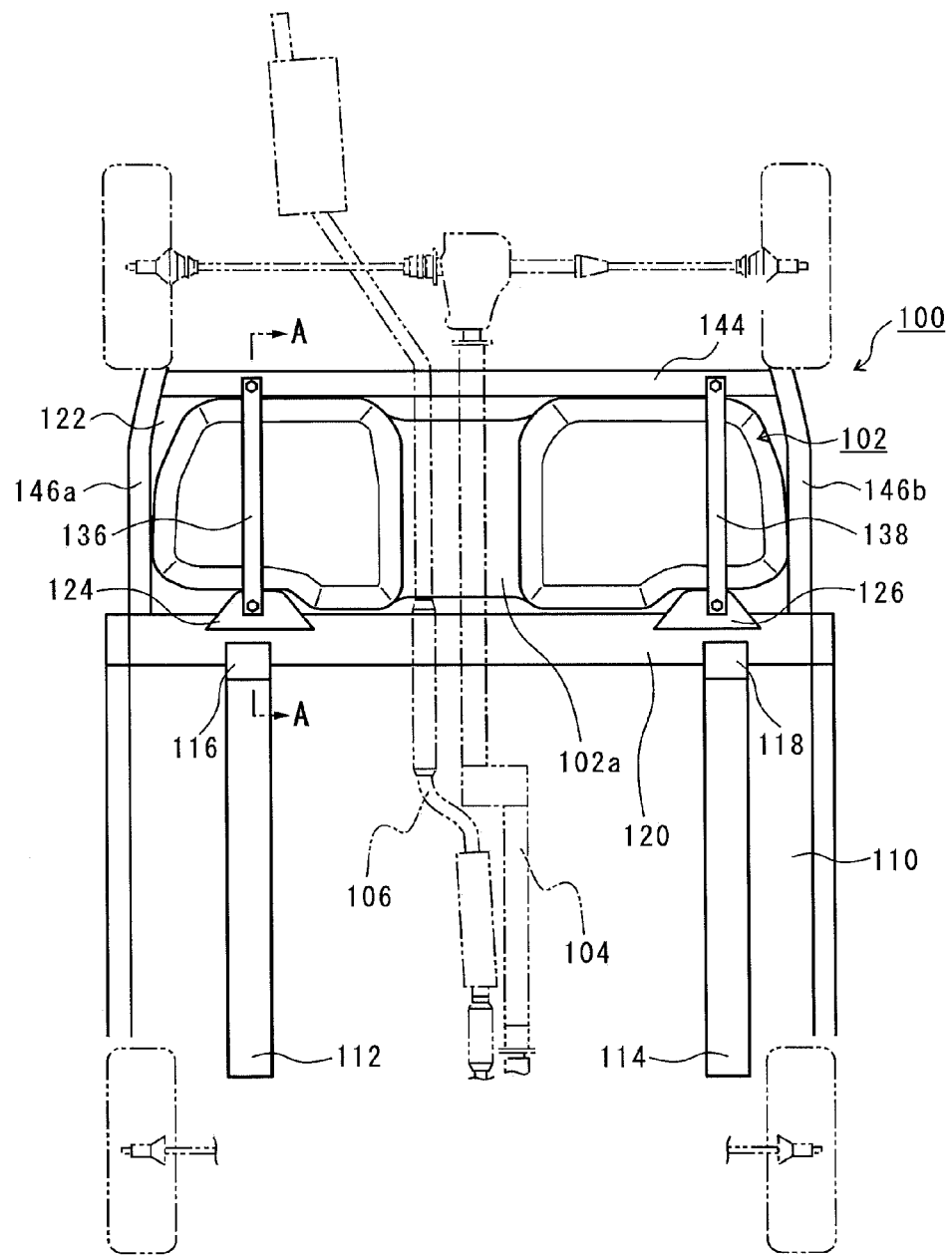
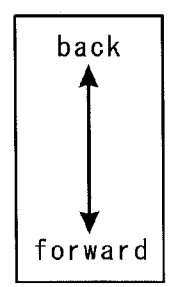

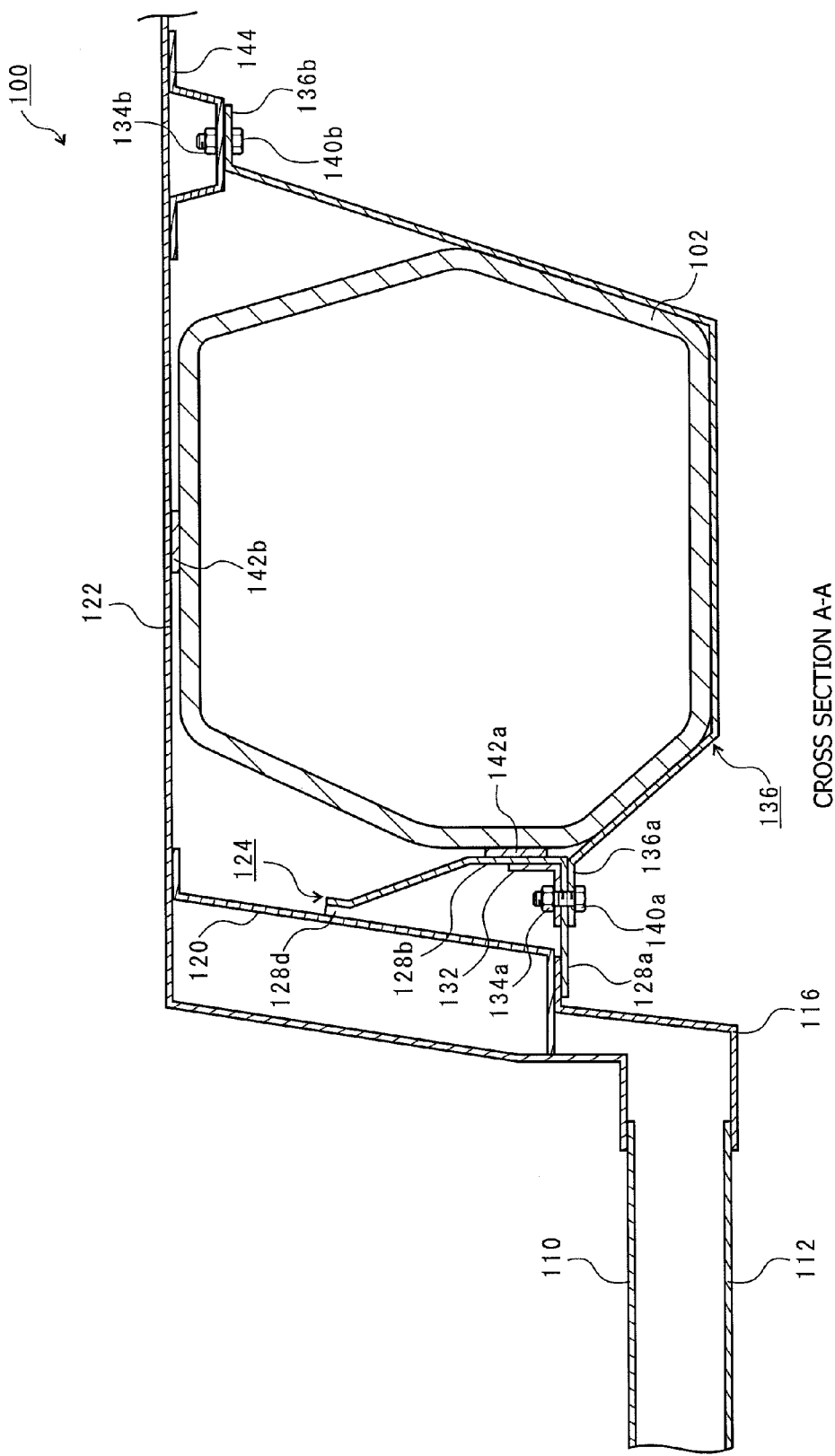

FUEL TANK MOUNTING STRUCTURE FOR VEHICLE

CROSS-REFERENCE TO RELATED APPLICATIONS

The present application claims the benefit of Japanese Patent Application No. 2010-173075, filed Jul. 30, 2010, the disclosure of which is hereby incorporated by reference herein.

FIELD OF THE INVENTION

The present invention relates to a fuel tank mounting structure for a vehicle, in which structure a fuel tank is hung under a rear floor panel defining a floor in a vehicle rear portion by belts.

BACKGROUND OF THE INVENTION

In general, a fuel tank of an automobile is hung under a rear floor panel by belts. Such a fuel tank is filled with a fuel, which sloshes because of acceleration, deceleration, or the like of the vehicle, so that a fuel sloshing sound (splashing sound) is generated. In this respect, various techniques have been proposed conventionally to reduce the fuel sloshing sound.

For example, JP2001-63389A discloses a fuel tank disposition structure in which a recessed portion is formed in a flat floor panel, and a fuel tank is fixed by being pressed onto corner positions of the recessed portion by belts, via pads. It is said that since the rigidity is higher in the corner positions of the recessed portion than in the other flat portions, the technique can reduce the transmission of sound from the fuel tank to the floor panel, and can prevent leakage of the fuel sloshing sound in the fuel tank to the vehicle interior.

In JP2001-63389A, front attachment portions of the belts used to hang the fuel tank are attached to a rear-floor front cross member (a seat cross member) under the floor panel, and it seems according to the drawings that a front surface of the fuel tank does not abut on anything. Setting the front surface of the fuel tank free as described above makes the fuel tank itself not fixed firmly and thus is not preferable from the viewpoint of safety. Meanwhile, suppose a case where the front surface of the fuel tank abuts on the rear-floor front cross member. In such a case, when the front surface of the fuel tank is pressed onto the rear-floor front cross member at the flat surface portion thereof which has a relatively low rigidity, the flat surface portion of the rear-floor front cross member vibrates as a result of the fuel sloshing, and the sound of the fuel sloshing may be transmitted to the vehicle interior.

BRIEF SUMMARY OF THE INVENTION

The present invention has been made in view of such problems, and an object of the present invention is to provide a fuel tank mounting structure for a vehicle, which enables the lowering of the level of noise in a vehicle interior due to the sloshing of a fuel stored in a fuel tank.

To solve the above-described problems, the fuel tank mounting structure for a vehicle according to the present invention includes: a rear floor panel defining a rear portion floor; a first cross member (rear-floor front cross member) being disposed in front of and under the rear floor panel and extending in a vehicle width direction; a second cross member (rear floor center cross member) being disposed rearward of the first cross member and extending in the vehicle width direction; and a fuel tank supported by right and left belts stretched between the first cross member and the second cross member so as to abut on an undersurface of the rear floor panel via a resilient pad, wherein the first cross member is provided with right and left brackets each projected rearward from the first cross member; front ends of the belts are connected to the respective brackets; and the fuel tank is fastened so as to abut on rear surfaces of the brackets via respective second resilient pads.

With such a structure, the front surface of the fuel tank is pressed not onto the first cross member, but onto the rear surfaces of the brackets via pads. Since the brackets are members separated from the first cross member, the rigidity, which is dependent on the plate thickness and the shape thereof, and the abutment surface of each bracket can be set freely. Specifically, the fuel tank is away from the first cross member which has a low rigidity and which is hence likely to vibrate, while the brackets whose rigidities are dependent on the plate thicknesses and the shapes thereof and whose abutment surfaces can be set freely are interposed between the fuel tank and the first cross member. Hence, it is possible to reduce the level of noise in the vehicle interior due to the fuel sloshing.

Preferably, each of the brackets has a cup shape, and has a larger plate thickness than the first cross member (rear-floor front cross member). Since this can make the rigidity of each bracket higher than that of the first cross member, it is possible to reliably reduce the level of noise in the vehicle interior due to the fuel sloshing.

Preferably, each of the cup-shaped portions has the rear surface, a lower surface, and opposed side surfaces; the lower surface of each of the cup-shaped portions is provided with a connecting portion to which the front end of each belt is connected; and a reinforcing plate is provided inside of each cup-shaped portion across the connecting portion and the rear surface. Welding a nut to the lower surface of the cup-shaped portion can increase the rigidity of the lower surface of each bracket. In addition, providing the reinforcing plate extending from the connecting portion to the rear surface can increase the plate thickness, and achieve a rigidity improvement effect with the presence of a bent portion.

In addition, the connecting portion receives a large tension from the belt. The tension is transmitted also to the reinforcing plate joined across the connecting portion and the rear surface of the bracket. This makes it possible to suppress the vibration (transmission of sound) of the rear surface. Hence, it is possible to further reduce the level of noise in the vehicle interior due to the fuel sloshing.

Preferably, the fuel tank mounting structure for a vehicle according to the present invention further includes: a front floor panel defining a floor in front of the first cross member (rear-floor front cross member); front floor side members extending in a vehicle front-rear direction on the undersurface of the front floor panel; and cap members joined to rear ends of the front floor side members and a lower end of the first cross member. In addition, each of the brackets is preferably joined to a joint portion at which the first cross member and the corresponding one of the cap members are joined or to the vicinity of the joint portion. As a result, each bracket is joined to the vicinity of the joint portion at which the first cross member and the cap member are joined, the joint portion having a high rigidity, so that the strength of the joined portion of the bracket can be secured. Hence, it is possible to further reliably reduce the level of noise in the vehicle interior due to the fuel sloshing.

Preferably, the abutment portion of each of the brackets on the fuel tank is set on a lower side of the fuel tank. In a vehicle manufacturing line, the fuel tank is mounted from a lower side of a vehicle body hung above. With the above described structure, the abutment portion on the fuel tank can be observed directly with the eyes in mounting the fuel tank. Hence, the positioning between the vehicle body and the fuel tank can be conducted precisely and easily.

The present invention makes it possible to provide a fuel tank mounting structure for a vehicle, which enables the lowering of the level of noise in a vehicle interior due to sloshing of fuel stored in a fuel tank.

BRIEF DESCRIPTION OF THE DRAWINGS

FIG. 1 is a view showing a lower portion of a vehicle body in which a fuel tank mounting structure for a vehicle according to an embodiment of the present invention is applied.

FIG. 2 is a cross-sectional view taken along the line A-A in FIG. 1.

DETAILED DESCRIPTION OF THE INVENTION

Figure 3A:
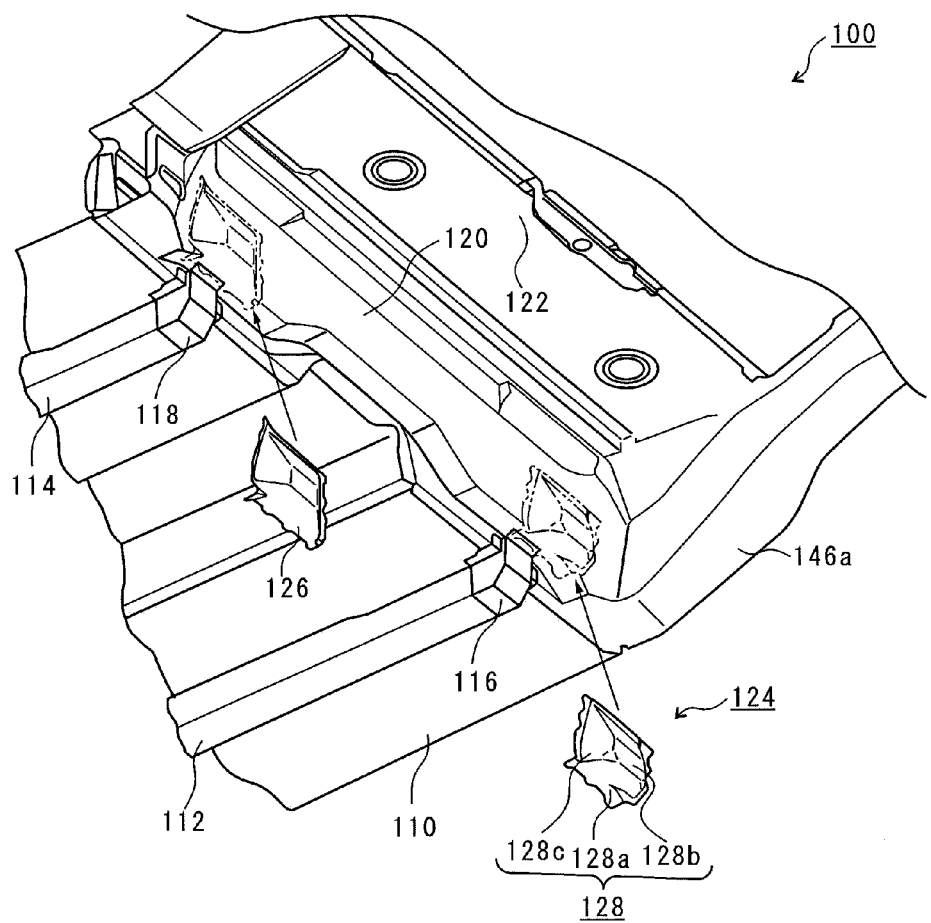
FIGS. 3A to 3C are exploded perspective views of main portions of the fuel tank mounting structure for a vehicle according to the embodiment of the present invention.

Hereinafter, a preferred embodiment of the present invention will be described in detail with reference to the accompanying drawings. The dimensions, materials, other specific numeric values, and the like shown in the embodiment are mere examples for facilitating the understanding of the invention and are not used for limiting the present invention unless otherwise noted. Note that in this specification and the drawings, components having substantially the same functions and structures are denoted by the same reference numerals, and overlapped description thereof is omitted. In addition, components which do not directly relate to the present invention are not shown in the drawings.

FIG. 1 is a view illustrating a lower portion of a vehicle body to which a vehicle fuel tank mounting structure 100 according to this embodiment is applied. FIG. 2 is a cross-sectional view taken along the line A-A of FIG. 1. Here, the fuel tank mounting structure 100 for a vehicle is applied to a four-wheel drive vehicle, but the embodiment is not limited to such an example.

As shown in FIGS. 1 and 2, a fuel tank 102 is hung under a rear floor panel 122 defining a floor in a vehicle rear portion by a pair of belts 136 and 138. Around a center of the fuel tank 102, a recess 102a is formed to avoid interference with a propeller shaft 104 and an exhaust pipe 106.

A front end of the rear floor panel 122 is connected to a front floor panel 110 defining a floor in a vehicle front portion. Two front floor side members 112 and 114 extending in a vehicle front-rear direction are joined to an undersurface of the front floor panel 110. Cap members 116 and 118 are respectively joined to rear end portions of the front floor side members 112 and 114 in such a manner as to cover openings in cross-sections of the front floor side members 112 and 114.

A first cross member (hereinafter referred to as a rear-floor front cross member 120) extending in a vehicle width direction is provided in front of and under the rear floor panel 122. Second ends (rear ends) of the cap members 116 and 118 are joined to a lower end of the rear-floor front cross member 120.

Rear floor side members 146a and 146b extending in the vehicle front-rear direction are joined to the rear-floor front cross member 120 on both right and left outer sides of the rear-floor front cross member 120 in the vehicle width direction. A second cross member (hereinafter referred to as a rear floor center cross member 144) extending in the vehicle width direction is joined to rear portions of the rear floor side members 146a and 146b.

Here, front attachment portions 136a of the belts 136 and 138 are respectively fastened to brackets 124 and 126 to be described later, whereas rear attachment portions 136b thereof are fastened to the rear floor center cross member 144.

Figure 3B:
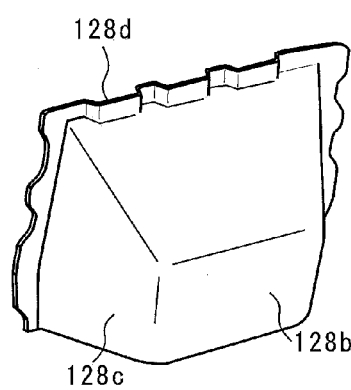
Figure 3C:
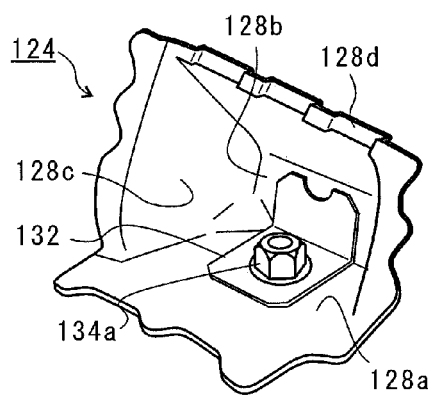

FIGS. 3A to 3C are exploded perspective views of main portions of the fuel tank mounting structure 100 for a vehicle according to this embodiment. FIG. 3A shows a state before the brackets 124 and 126 are welded to the rear-floor front cross member 120; FIG. 3B shows a front side of the right bracket 124 in FIG. 3A; and FIG. 3C shows a back side of the bracket 124.

As shown in FIG. 3A, in this embodiment, the two brackets 124 and 126 are joined in such a manner as to project rearward of the rear-floor front cross member 120. The brackets 124 and 126 are each an independent (separated) member, and the rigidities and abutment surfaces thereof, which are dependent on the plate thickness and the shape, can be set freely. Since the brackets 124 and 126 have substantially the same structures, the bracket 124 is taken as a representative in the following description.

The bracket 124 includes a cup-shaped portion 128 having a cup shape (drawn portion) formed of a lower surface 128a, a rear surface 128b, and side faces 128c. The plate thickness of the cup-shaped portion 128 is larger than that of the rear-floor front cross member 120.

As shown in FIG. 3B, some portions of the bracket 124 on an upper edge thereof are recessed (shown as "recessed portions 128d" in FIG. 3B). As a result, when the bracket 124 is joined to the rear-floor front cross member 120, gaps are formed therebetween. This allows, for example, flowing of an electrodeposition liquid in a vehicle manufacturing process (a later process), and thus brings about no problem.

Description will be given with reference to again FIG. 2. The lower surface 128a of the bracket 124 is joined to the vicinity of a joint portion at which the rear-floor front cross member 120 and the cap member 116 are joined because the rigidity is high in the vicinity of the joint portion. Thus, the strength of the joint portion of the bracket 124 can be secured.

As shown in FIGS. 2 and 3C, a reinforcing plate 132 is joined to the bracket 124 in such a manner as to extend from the lower surface 128a to the rear surface 128b inside the cup-shaped portion 128. Here, a nut 134a is welded to an upper surface of the reinforcing plate 132, and the front attachment portion 136a of the belt 136 is fastened with a bolt 140a. The nut 134a does not necessarily have to be welded to the upper surface of the reinforcing plate 132, but it is only necessary that the reinforcing plate 132 is located in the vicinity of the nut 134a.

The joining of the reinforcing plate 132 increases the plate thickness, and makes it possible to achieve an effect of increasing the rigidity with the presence of a bent portion. In addition, the welding of the nut 134a can increase the rigidity of the lower surface 128a of the bracket 124.

In addition, the nut 134a receives a high tension from the belt 136 (the front attachment portion 136a). The tension is also transmitted to the reinforcing plate 132 joined across the vicinity of the nut 134a and the bracket rear surface 128b. For this reason, the tension is also applied onto the bracket rear surface 128b so that the vibration (transmission of sound) of the rear surface 128b can be suppressed.

A second resilient pad 142a (a shim rubber or the like) is disposed on a rear surface of the bracket 124. Then, a front surface of the fuel tank 102 being hung is pressed onto the rear surface of the bracket 124 via the second pad 142a.

In this embodiment, as described above, the plate thickness of the cup-shaped portion 128 is larger than that of the rear-floor front cross member 120, and the rigidity thereof is secured also by the reinforcing plate 132 and the like. The front surface of the fuel tank 102 is away from the rear-floor front cross member 120 which has a low rigidity and which vibrates easily, but abuts on the rear surface 128b of the bracket 124 which has a secured rigidity and which does not vibrate easily. The above-described tension is applied onto the rear surface 128b, so that the vibration of the rear surface 128b is suppressed. Hence, it is possible to reliably reduce the level of noise in the vehicle interior due to the fuel sloshing.

Meanwhile, in a vehicle manufacturing line, the fuel tank 102 is mounted from the lower side of the vehicle body hung above. As can be seen from FIGS. 1 and 2, the fuel tank 102 has a shape almost like a barrel (a cylindrical shape). Hence, in mounting the fuel tank 102 on a vehicle body, the fuel tank 102 is likely to fall down in the vehicle front-rear direction about an axis in the longitudinal direction (the vehicle width direction). In this embodiment, the abutment portion of the bracket 124 on the fuel tank 102 is set on a lower side of the fuel tank 102. For this reason, the abutment portion on the fuel tank 102 via the second pad 142a can be observed directly with the eyes in mounting the fuel tank 102. Hence, the positioning between the vehicle body and the fuel tank 102 can be conducted precisely and easily.

An upper surface of the fuel tank 102 abuts on an undersurface of the rear floor panel 122 via a resilient pad 142b. In general, what becomes a problem is that the vibration due to the sloshing of the fuel stored in the fuel tank 102 is transmitted to the front of the vehicle at the time of braking. Hence, the transmission of sound through the upper surface of the fuel tank 102 to the vehicle interior is less problematic than the transition of sound through the front surface of the fuel tank 102 to the vehicle interior.

A nut 134b is welded to an inner side of the lower surface of the rear floor center cross member 144 located rearward of the fuel tank 102. The rear attachment portion 136b of the belt 136 is fastened to the nut 134b with a bolt 140b. Specifically, the belt 136 of this embodiment is stretched from the bracket 124 to the rear floor center cross member 144, and fastens the fuel tank 102.

Figure 4:
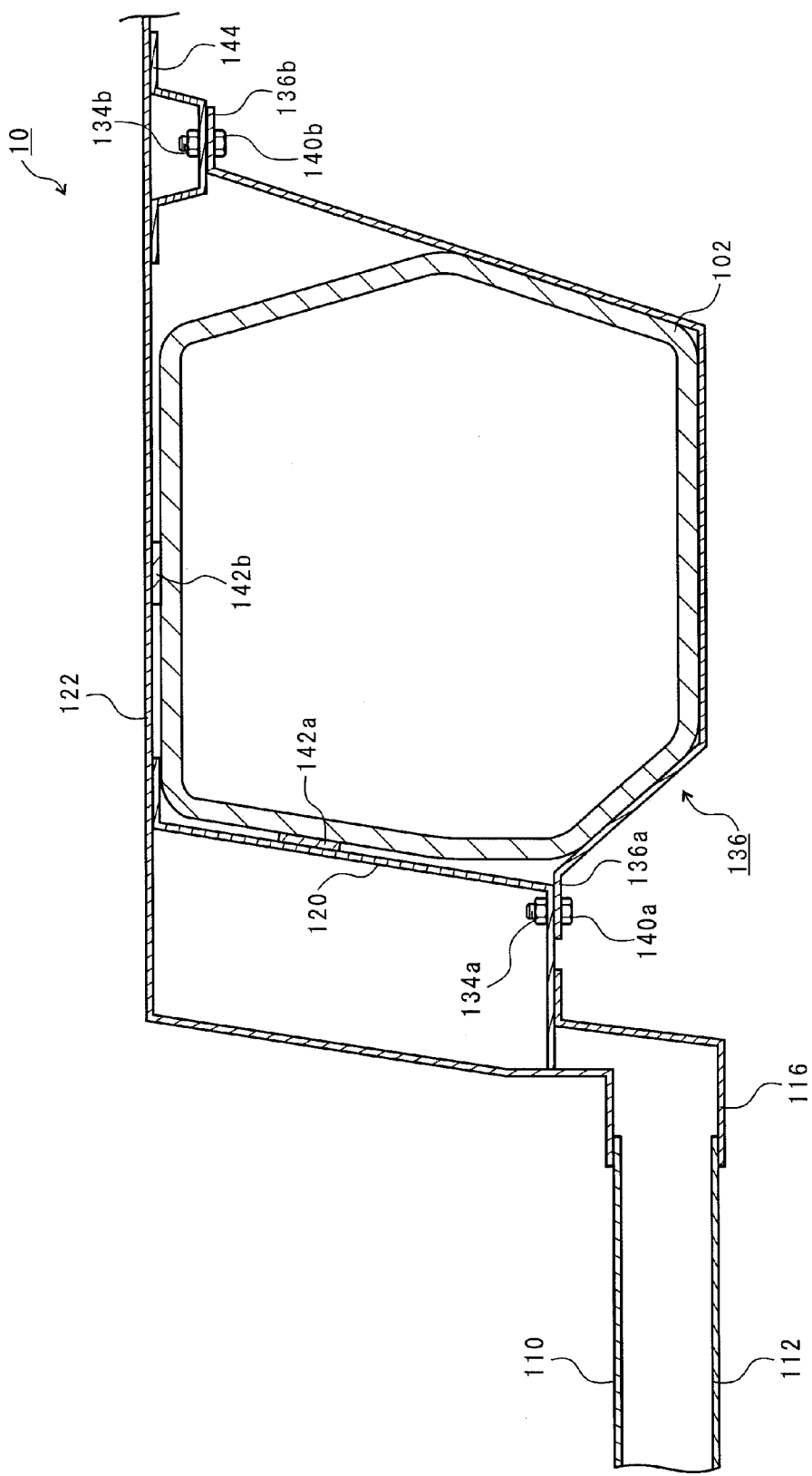
FIG. 4 is a cross-sectional view showing a fuel tank mounting structure for a vehicle of Comparative Example.

FIG. 4 is a cross-sectional view showing a fuel tank mounting structure 10 for a vehicle of Comparative Example. As shown in FIG. 4, in the structure, a front surface of a fuel tank 102 is directly pressed onto a flat surface portion of a rear-floor front cross member 120 having a low rigidity. This structure has a problem that the flat surface portion of the rear-floor front cross member 120 vibrates, and the fuel sloshing sound is likely to resonate in the vehicle interior. In addition, since various limitations such as limitations in terms of the costs, the weight, and the layout depending on the type of the car are imposed on the plate thickness, the shape, and the abutment surface of the rear-floor front cross member 120, the degrees of freedom in setting the plate thickness, the shape, and the abutment surface are limited.

Moreover, since the second pad 142a interposed between the rear-floor front cross member 120 and the fuel tank 102 is located at a deep position, the abutment portion of the second pad 142a cannot be observed visually in mounting the fuel tank 102 on a vehicle body, which makes the positioning therebetween difficult.

In comparison with the fuel tank mounting structure 10 for a vehicle, in the fuel tank mounting structure 100 for a vehicle of this embodiment, the front surface of the fuel tank 102 is away from the rear-floor front cross member 120 which has a low rigidity and which vibrates easily, but abuts on the rear surface 128b of the bracket 124 which has a secured rigidity and which does not vibrate easily. Hence, it is possible to reduce the level of noise in the vehicle interior due to the fuel sloshing.

Meanwhile, the abutment portion (the second pad 142a) of each of the brackets 124 on the fuel tank 102 is set on a lower side of the rear surface 128b adjacent to the lower surface 128a (lower end portion) of the bracket 124. Thus, the abutment portion on the fuel tank 102 via the second pad 142a can be observed directly with the eyes in mounting the fuel tank 102. Hence, the positioning between the vehicle body and the fuel tank 102 can be conducted precisely and easily.

Hereinabove, description is given of the preferred embodiment of the present invention with reference to the accompanying drawings. However, it should be understood that the present invention is not limited to such examples, but further various alterations and modifications should exist within the scope of the present invention.

What is claimed is:

1. A fuel tank mounting structure for a vehicle, the vehicle comprising:
   a rear floor panel forming a rear portion floor;
   a first cross member being disposed in front of and under the rear floor panel and extending in a vehicle width direction;
   a second cross member being disposed rearward of the first cross member and extending in the vehicle width direction; and
   a fuel tank supported by right and left belts stretched between the first cross member and the second cross member so as to abut on an undersurface of the rear floor panel via a resilient pad,
   wherein the first cross member is provided with right and left brackets each projected rearward from the first cross member, front ends of the belts are connected to the respective brackets, and the fuel tank is fastened so as to abut on rear surfaces of the brackets via respective second resilient pads.

2. The fuel tank mounting structure for the vehicle according to claim 1, wherein each of the brackets has a cup-shaped portion having a larger plate thickness than the first cross member.

3. The fuel tank mounting structure for the vehicle according to claim 2, wherein each cup-shaped portion has the rear surface, a lower surface, and opposed side surfaces; the lower surface of each cup-shaped portion is provided with a connecting portion to which the front end of each belt is connected; and a reinforcing plate is provided inside of each cup-shaped portion across the connecting portion and the rear surface.

4. The fuel tank mounting structure for the vehicle according to claim 1, the vehicle further comprising:
   a front floor panel defining a floor in front of the first cross member;
   right and left front floor side members being disposed on an undersurface of the front floor panel and extending in a vehicle front-rear direction; and
   right and left cap members joined to rear ends of the front floor side members and to a lower end of the first cross member,
   wherein the brackets are joined to respective joint portions at which the first cross member and the cap members are joined, or to a vicinity of the joint portions.

5. The fuel tank mounting structure for the vehicle according to claim 1, wherein each of the second resilient pads is placed on a lower portion of the rear surface adjacent to a lower end portion of the bracket.

* * * * *